US008656945B2

(12) United States Patent
Nicolini et al.

(10) Patent No.: US 8,656,945 B2
(45) Date of Patent: Feb. 25, 2014

(54) PRESSURE CONTROL VALVE ASSEMBLY FOR CONTAINERS ADAPTED TO CONTAIN COMPRESSED FLUIDS

(75) Inventors: Giancarlo Nicolini, Villanuova Sul Clisi (IT); Ezio Cavagna, Lumezzane (IT)

(73) Assignee: Cavagna Group S.p.A. (IT)

( * ) Notice: Subject to any disclaimer, the term of this patent is extended or adjusted under 35 U.S.C. 154(b) by 178 days.

(21) Appl. No.: 13/056,947

(22) PCT Filed: Jul. 29, 2009

(86) PCT No.: PCT/IB2009/006430
§ 371 (c)(1), (2), (4) Date: Jan. 31, 2010

(87) PCT Pub. No.: WO2010/013135
PCT Pub. Date: Feb. 4, 2010

(65) Prior Publication Data

US 2011/0155267 A1 Jun. 30, 2011

(30) Foreign Application Priority Data

Jul. 31, 2008 (IT) .................................. PD08A0236

(51) Int. Cl.
*F16K 31/12* (2006.01)

(52) U.S. Cl.
USPC ................. 137/505.12; 137/505.25; 137/588; 251/325

(58) Field of Classification Search
USPC .................... 137/505.12, 505.25, 588; 222/3; 251/325
See application file for complete search history.

(56) References Cited

U.S. PATENT DOCUMENTS

| | | | | |
|---|---|---|---|---|
| 4,655,246 | A * | 4/1987 | Phlipot et al. | 137/505.11 |
| 4,844,111 | A * | 7/1989 | Pritchard et al. | 137/71 |
| 4,898,205 | A * | 2/1990 | Ross | 137/505.12 |
| 5,303,734 | A | 4/1994 | Eidsmore | |
| 5,307,834 | A * | 5/1994 | Tatarek-Gintowt et al. | 137/505.11 |
| 5,694,975 | A | 12/1997 | Eidsmore | |
| 6,186,168 | B1 * | 2/2001 | Schultz et al. | 137/505.11 |
| 6,257,000 | B1 | 7/2001 | Wang | |
| 6,343,476 | B1 | 2/2002 | Wang et al. | |
| 6,360,546 | B1 * | 3/2002 | Wang et al. | 62/48.1 |
| 6,474,076 | B2 * | 11/2002 | Wang et al. | 62/48.1 |
| 6,851,447 | B1 * | 2/2005 | Carroll | 137/505.25 |
| 6,901,952 | B2 * | 6/2005 | Girouard | 137/505.12 |
| 2002/0014227 | A1 | 2/2002 | Girouard | |

(Continued)

FOREIGN PATENT DOCUMENTS

| | | |
|---|---|---|
| EP | 0233775 | 8/1987 |
| EP | 1000291 | 5/2000 |

(Continued)

OTHER PUBLICATIONS

International Search Report; PCT/IB2009/006430; Oct. 15, 2009.

(Continued)

*Primary Examiner* — Craig Schneider
*Assistant Examiner* — Jessica Cahill
(74) *Attorney, Agent, or Firm* — Cantor Colburn LLP

(57) ABSTRACT

A pressure control valve assembly for containers adapted to contain compressed and liquefied gases, comprising a valve body that can be applied to a container for gases and the like, in which a first duct for the gas in output from said container and a pressure regulator device connected to the inside of said container and to said first duct are defined, said pressure regulator device being fully placeable within said container, said regulator device comprising at least one regulator of the piston type.

3 Claims, 6 Drawing Sheets

(56) References Cited

U.S. PATENT DOCUMENTS

| | | | |
|---|---|---|---|
| 2003/0213521 A1 | 11/2003 | Downie | |
| 2005/0274422 A1 | 12/2005 | Downie | |
| 2009/0166359 A1 | 7/2009 | Pisot | |
| 2009/0223580 A1 | 9/2009 | Denis et al. | |
| 2009/0223976 A1 | 9/2009 | Denis et al. | |

FOREIGN PATENT DOCUMENTS

| | | |
|---|---|---|
| EP | 1367316 | 12/2003 |
| EP | 1610053 | 12/2005 |
| WO | 0171242 | 9/2001 |
| WO | 0201306 | 1/2002 |
| WO | 2004065750 | 8/2004 |
| WO | 2007048954 | 5/2007 |
| WO | WO2007048957 A1 * | 5/2007 |

OTHER PUBLICATIONS

Italian Search Report; ITPD20080236; dated Jun. 29, 2009.

* cited by examiner

PRESSURE CONTROL VALVE ASSEMBLY FOR CONTAINERS ADAPTED TO CONTAIN COMPRESSED FLUIDS

TECHNICAL FIELD

The present invention relates to a pressure control valve assembly for containers adapted to contain compressed or liquefied gases having pressures higher than the atmospheric pressure.

BACKGROUND ART

Some of said containers, better known as cylinders, are used widely as containers for high-pressure industrial or medical gases, for example oxygen, air, industrial gases and gases for domestic use.

Since the gas contained in the cylinder, in order to be used, must reach the user at a pressure that is close to the atmospheric pressure or in any case considerably lower than the pressure inside said container, dispensing valves and pressure reduction units are typically connected to these containers according to various configurations.

A typical configuration of a gas dispensing system uses a high-pressure line in output from the cylinder, along which there are in series a flow control valve, which is proximate to the cylinder, and a pressure regulator, the output of which is connected to a low-pressure line, which conveys the gas to the user device.

According to a different configuration, there is provided a dispensing system in which a flow control valve and a pressure regulator are integrated in series in a single device, known as VIPR ("Valve Integrated Pressure Regulator"), so as to reduce the length of the high-pressure line.

In both embodiments, the pressure regulator, arranged externally to the cylinder, makes it possible to utilize easily the constant pressure reference provided by atmospheric pressure in order to obtain a pressure of the gas in output from the reduction unit that is constant although the pressure in the cylinder is variable and proportional to the quantity of gas in said cylinder. However, both solutions, by having a high-pressure line outside the cylinder, have safety problems, which are particularly challenging in applications in which the gas is stored at particularly high pressures and the cylinder, during use, is located in the immediate vicinity of the user and/or user device.

This problem can be solved by means of dispensing systems in which the pressure regulator is accommodated entirely within the cylinder, so that at the output of said cylinder only gas at the operating pressure is available. This solution, particularly when applied to gases compressed with pressures that are considerably higher than the atmospheric pressure, has the drawback that the internal regulator does not work with a constant reference pressure in all operating conditions.

Another problem of the solutions with an internal pressure reduction unit consists in the space occupation of said reduction unit, which must be insertable in the cylinder through a threaded coupling hole provided thereon.

For example, the use of a membrane-type reduction unit makes the space occupation of the device in the direction that lies transversely to the axis of the cylinder incompatible with the coupling hole provided on traditional cylinders. To use this reduction unit it is therefore necessary to provide cylinders that are dedicated to it, with an enlarged hole, as for the solution described in EP 1000291.

DISCLOSURE OF THE INVENTION

The aim of the present invention is to provide a pressure control valve assembly for containers, particularly containers adapted to contain compressed fluids, which is conceived structurally and functionally so as to avoid all the drawbacks observed with reference to the cited background art.

This aim and other objects that will become apparent hereinafter are dealt with and achieved by the invention by means of a valve assembly provided according to the claims that follow.

BRIEF DESCRIPTION OF DRAWINGS

The characteristics and advantages of the invention will become better apparent from the detailed description that follows of a preferred example of embodiment thereof, illustrated by way of non-limiting example, with reference to the accompanying drawings, wherein.

WAYS TO CARRYING OUT THE INVENTION

Figure 1:
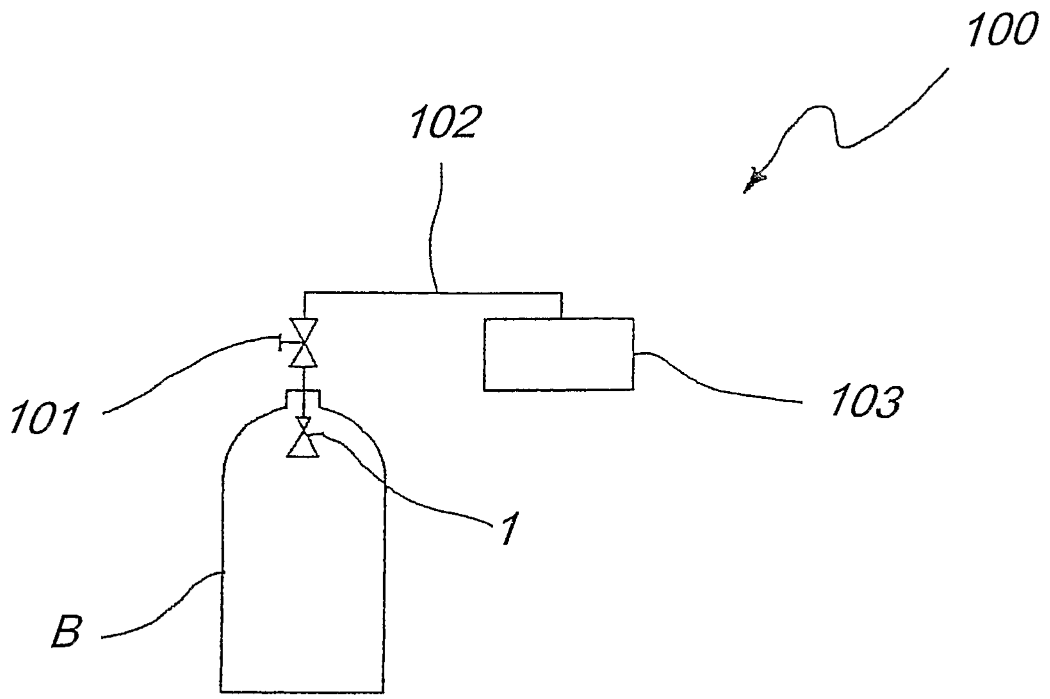
FIG. 1 is a schematic view of a system for dispensing compressed fluids, which comprises a pressure control valve assembly according to the present invention.

In the schematic view of FIG. 1, the reference numeral 100 generally designates a system for dispensing compressed fluids according to the present invention. The system 100 comprises a container (cylinder B of the traditional type), a pressure control valve assembly 1 and a flow control valve 101, which is external to the cylinder B and connected to the valve assembly 1. The valve assembly 1 comprises a pressure regulator in order to bring the compressed fluid to the operating pressure, which pressure regulator is entirely accommodated within the cylinder B, as described in greater detail hereinafter. A dispensing duct 102 is connected to the flow control valve 101 on the side opposite to the valve assembly 1, and the fluid, at the operating pressure, reaches a user device 103 through it.

Figure 2:
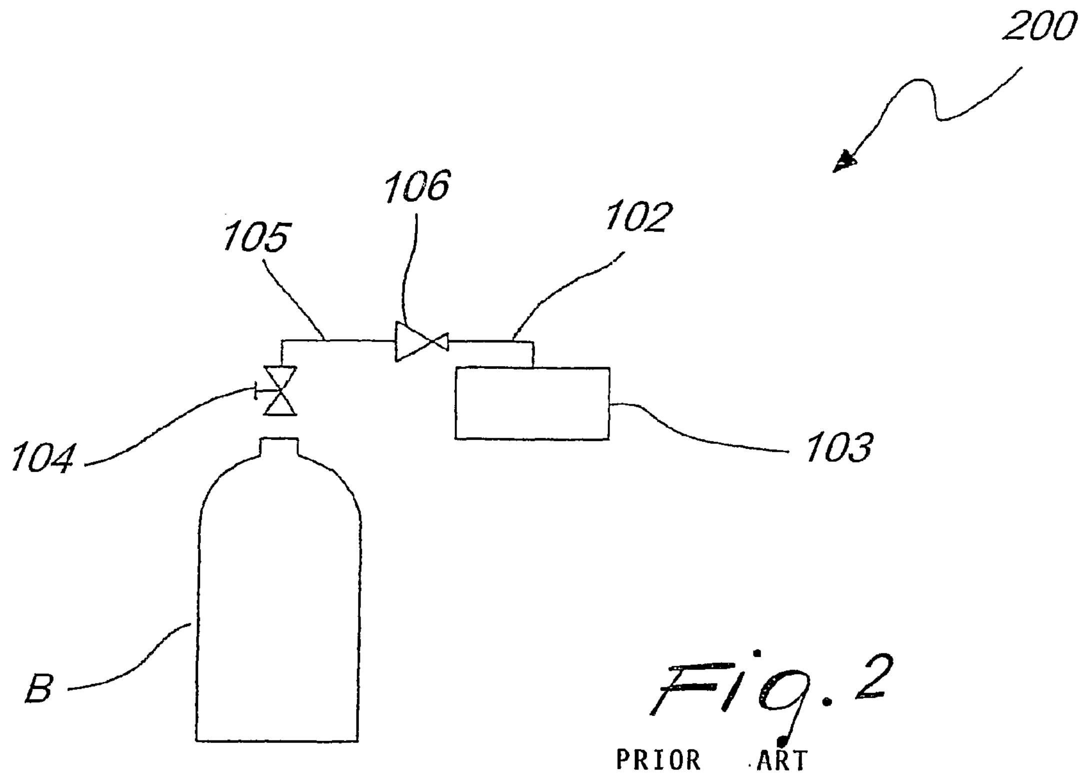
Fig. 2 PRIOR ART
FIGS. 2 and 3 are two schematic views, which correspond to the view of FIG. 1, of two respective dispensing systems for compressed fluids, which are known in the art.
Figure 3:
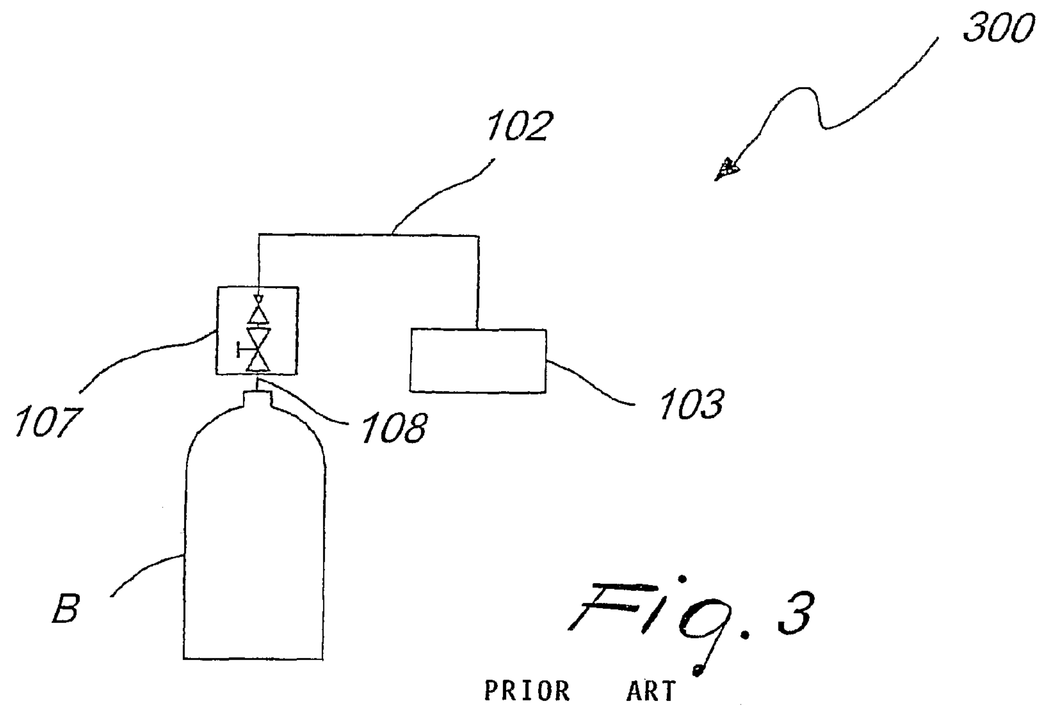
Fig. 3 PRIOR ART

The system 100 is different from the systems 200 and 300 for dispensing compressed fluids, shown schematically in FIGS. 2 and 3 respectively. In the system 200, a flow control valve 104, a high-pressure duct 105, a pressure regulator 106, the dispensing duct 102 and the user device 103 are connected sequentially to the output of the cylinder B. In the variation in FIG. 3, the system 300 comprises, at the output of the cylinder B, a connector 108, which is crossed by high-pressure fluid and connected to a dispensing device 107, in which a flow control valve and a pressure regulator are integrated. This type of device is known in the art by the acronym VIPR ("Valve Integrated Pressure Regulator"). The dispensing device 107 is connected to the dispensing duct 102 and to the user device 103.

Figure 4:
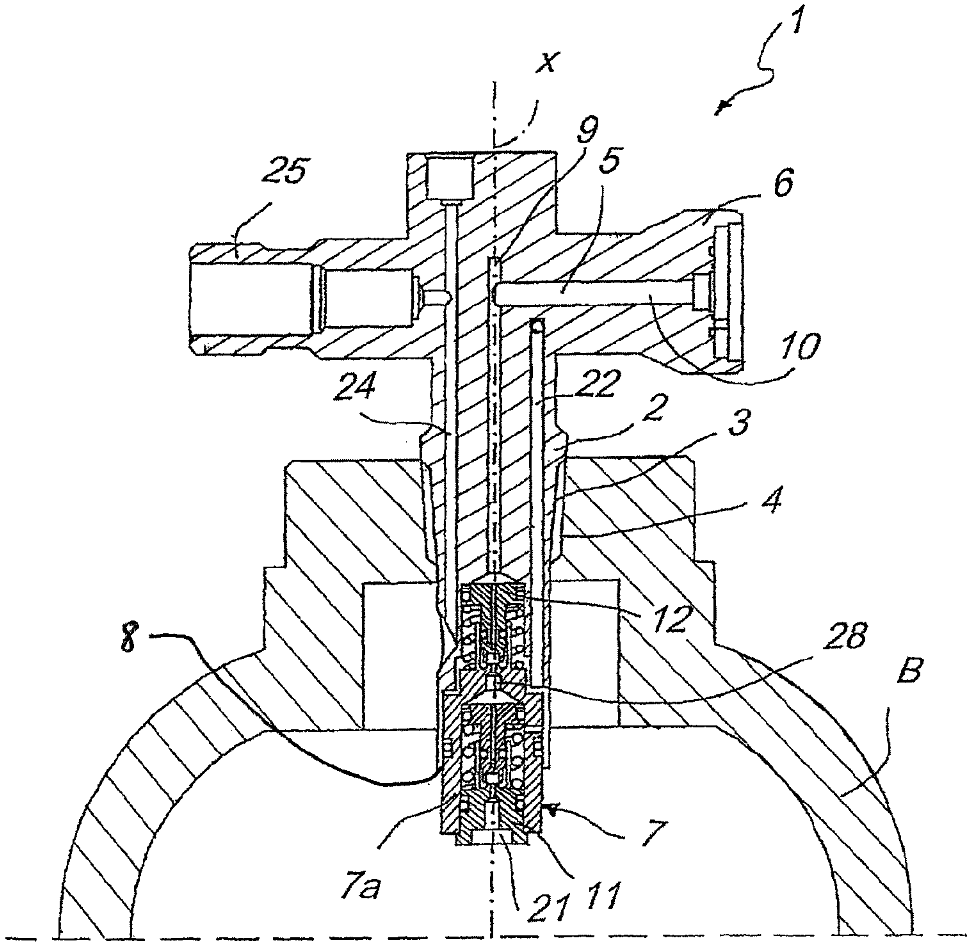
FIG. 4 is a sectional side view of a pressure control valve assembly according to the present invention.
Figure 5:
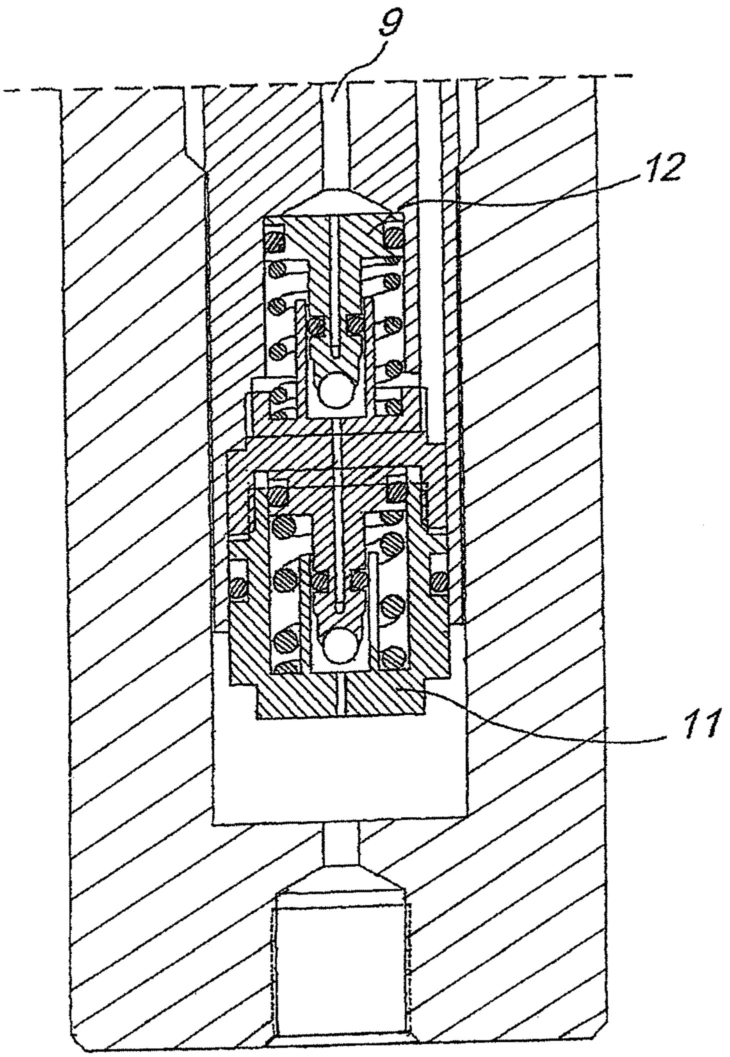
FIG. 5 is a sectional view of a detail of the valve assembly of FIG. 1.

In FIG. 4 onward, the valve assembly 1 is applied to a cylinder B, which has an axis X and is designed to contain compressed and liquefied gases. The assembly 1 comprises a valve body 2, which is provided with a threaded shank 3 by means of which the assembly 1 is screwed hermetically into a threaded hole 4 of the cylinder B. A first duct 5 for the gas that exits from the cylinder B is provided in the valve body 2, for connection between a delivery neck 6 and a pressure regulator device 7, which is formed at one end 8 of the valve body 2.

The end 8 and the regulator device 7 are arranged inside the cylinder B when the shank 3 is coupled to the threaded hole 4. The first duct 5 comprises two portions 9, 10, which are connected respectively to the regulator device 7 and to the dispensing neck 6. The portion 9 is substantially coaxial to the axis X of the cylinder B, whereas the portion 10 is substantially perpendicular thereto.

In the example of FIG. 4, the regulator device 7 comprises a regulator 7*a*, of the type known in the art as a two-stage piston regulator. The regulator 7*a* is provided with a first stage 11 and with a second stage 12, which are arranged in series and structurally identical.

Figure 6:
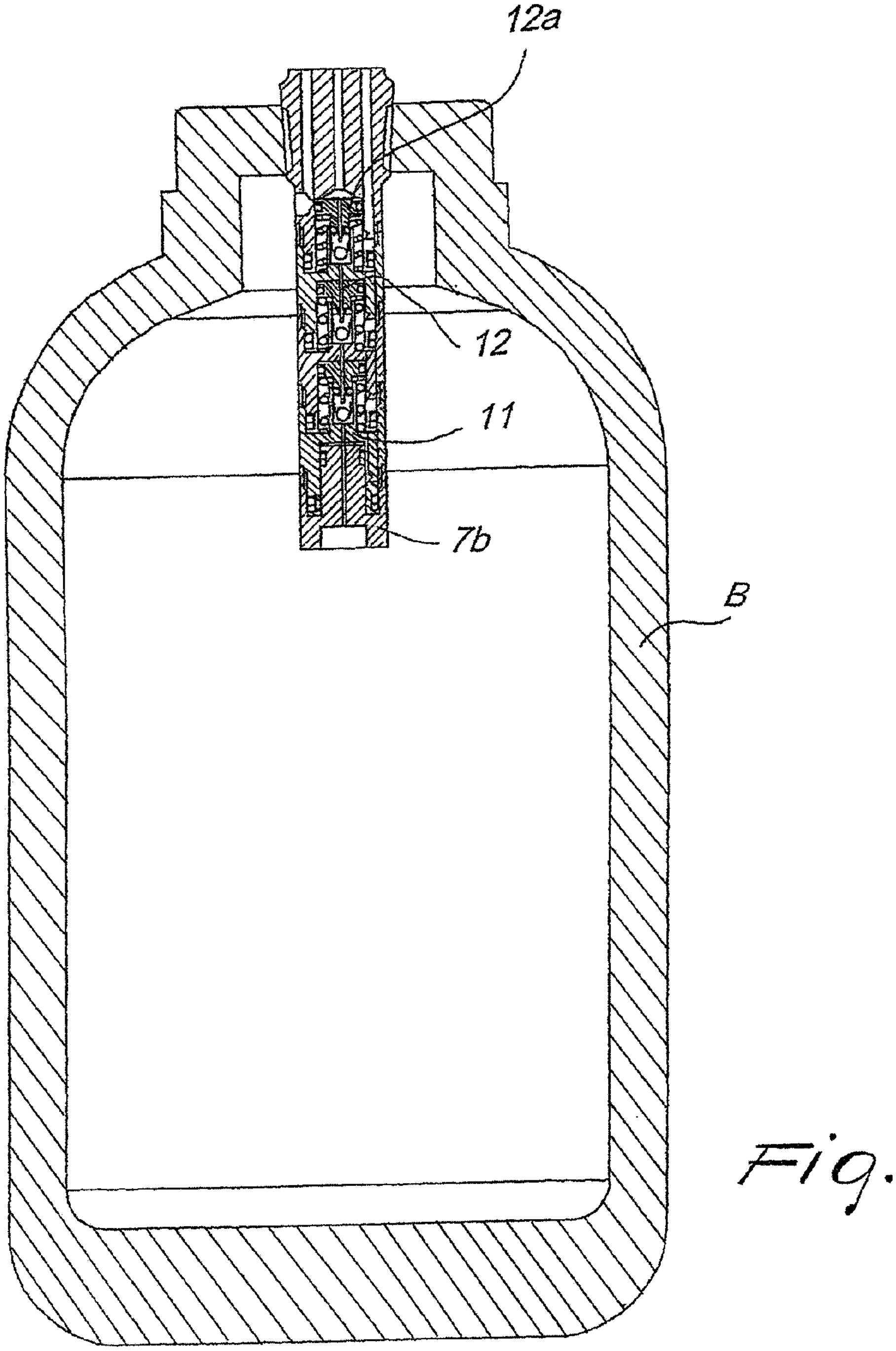
FIG. 6 is a sectional view of a constructive variation of the valve assembly of FIG. 1.
Figure 7:
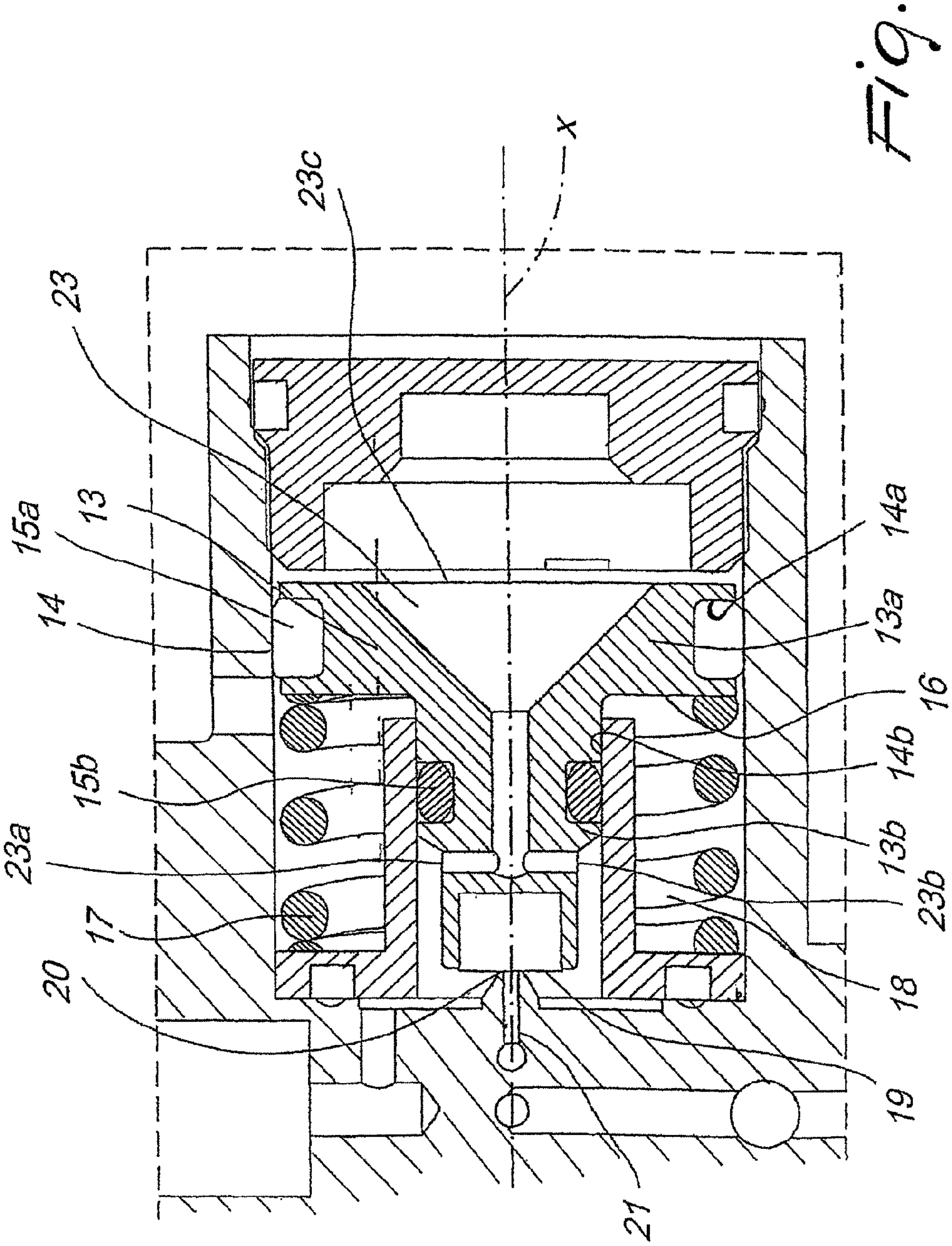
FIG. 7 is a sectional view of a detail of a valve assembly according to the present invention.

In the example of FIG. 6, the regulator device 7 comprises a regulator 7*b*, of the type known in the art as a three-stage piston regulator.

The regulator 7*b* is provided with a first stage 11, with a second stage 12 and with a third stage 12*a*, which are arranged in series and structurally identical.

The stages 11, 12, 12*a* have a per se conventional structure, being characterized by transverse dimensions with respect to the X-axis which allow insertion in the cylinder B through the threaded hole 4. For example, in a particular dimensional embodiment thereof, the valve body 1 can be applied to a size 25E (Whitworth thread) or M 25×2 (metric thread) threaded hole 4.

For the purposes of the present invention, it is in any case possible to conveniently use single-stage or multistage piston regulators with more than three stages as well, as long as their dimensions are compatible with the threaded hole 4.

Each one of the stages 11, 12, 12*a* comprises a respective flow control piston 13 with an X-axis, which can move in a sliding seat 14 provided in the valve body 2. The flow control piston 13 comprises two portions 13*a,b*, which are axially adjacent and have different diameters, with the portion 13*a*, which has a smaller diameter, being directed toward the inside of the cylinder B. The portions 13*a,b* are coupled slidingly to the two respective cylindrical surfaces 14*a,b* provided in the seat 14. The mating between the flow control piston 13 and the seat 14 is of the hermetic type, since a respective annular rubber gasket 15*a,b* is interposed between each one of the portions 13*a,b* and the respective cylindrical sliding surface 14*a,b*. The portions 13*a,b* are mutually connected by means of a shoulder 16, which is perpendicular to the X-axis and on which a spring 17 is active which is accommodated in a toroidal seat 18, which is formed between the cylindrical surfaces 14*a,b*. The portion 13*a* is provided with a cylindrical end 19, whose diameter is reduced with respect to the part that is mated with the seat 14*a*. The cylindrical end 19 rests on a valve seat 20, which is connected to the inside of the cylinder B by means of a high-pressure passage 21.

Inside the flow control piston 13 there is provided a passage 23 between two inlets 23*a,b*, which are provided on the lateral surface of the end 19, and an outlet 23*c*, which is formed on the head surface of the portion 13*b*.

The valve body 2 comprises a second duct 22, which extends predominantly in a direction that is parallel to the portion 9 of the first duct 5, for connection between the toroidal seat 18 and the environment outside the valve, so that said external pressure acts on the shoulder 16.

The gas inside the cylinder B flows along the high-pressure passage 21, passes through the valve seat 20 of the first stage 11, and is reduced to an intermediate pressure. From the valve seat 20, the gas laps the end 19 and enters the passage 23 through the inlets 23*a,b*. From the outlet 23*c* of the passage 23, through a connecting duct 28, the gas passes from the first stage 11 to the second stage 12.

In the constructive example of FIG. 4, in the stage 12 the gas is further reduced from the intermediate pressure to the operating pressure. At the output of the stage 12, the low-pressure gas reaches the dispensing neck 6 through the duct 5.

In the constructive example of FIG. 6, in the stage 12 the gas is further reduced before passing to the final stage 12*a*, at which it is brought to the operating pressure. At the output of the stage 12*a*, the low-pressure gas reaches the delivery neck 6 through the duct 5.

The valve body 2 comprises a third duct 24 for filling the cylinder B, which connects the inside of the cylinder B to a filling connector 25.

The present invention makes it possible to obtain a valve assembly with a pressure regulator that is internal to the cylinder B, having a constant reference pressure, by way of the duct 22, ensuring a constant output pressure from the cylinder B. Moreover, the use of a multistage piston reduction unit makes it possible to have a reduction unit that extends axially, so that it can be inserted in existing cylinders for pressurized fluids.

The invention therefore solves the proposed problem, at the same time achieving several advantages, for instance:

- with respect to solutions that have deformable elements, for example of the diaphragm type, the use of a piston regulator makes it possible to obtain an assembly that has greater constructive simplicity, with a consequent increase in reliability and reduction in production costs;
- the proposed configuration allows an arrangement of the regulators in sequence without a limitation in number, allowing all of them to have the atmospheric pressure as a reference;
- the possibility to introduce several stages allows a pressure reduction from the highest values to the operating values with very small variations.

The disclosures in Italian Patent Application no. PD2008A000236, from which this application claims priority, are incorporated herein by reference.

The invention claimed is:

1. A pressure control valve assembly for containers adapted to contain compressed and liquefied gases, comprising a valve body that can be applied to a container for compressed and liquefied gases, in which a first duct for the gas in output from said container and a pressure regulator device connected to an inside volume of said container and to said first duct are defined, said pressure regulator device being fully placeable within said container, said regulator device comprising at least one flow control piston, said valve body further comprising a seat into which said flow control piston can slide within said seat along an axis coaxial to a longitudinal axis of the container, the pressure control valve further comprising a second duct for connection between said pressure regulating device and the atmosphere outside the container so that an external reference pressure acts on a shoulder of the piston to ensure a constant output pressure from the container, wherein said flow control piston includes two axially adjacent portions of different diameters connected by means of the shoulder on which a spring is active, and wherein a toroidal seat is formed between two cylindrical surfaces to which said portions are respectively coupled in a sliding manner, said second duct connecting the seat to the environment that lies outside said container.

2. The valve assembly according to claim 1, wherein said pressure regulator is a multistage regulator device.

3. The valve assembly according to claim 1, wherein in said valve body a third duct for filling said container is defined.

* * * * *